US012223884B2

(12) United States Patent

Kim et al.

(10) Patent No.: US 12,223,884 B2

(45) Date of Patent: Feb. 11, 2025

(54) LED DRIVING CIRCUIT AND ITS DRIVING METHOD

(71) Applicant: LX Semicon Co., Ltd., Daejeon (KR)

(72) Inventors: Sang Suk Kim, Daejeon (KR); Jang Su Kim, Daejeon (KR); Ji Hwan Kim, Daejeon (KR); Jong Min Lee, Daejeon (KR); Kyeong Rok Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 152 days.

(21) Appl. No.: 18/193,808

(22) Filed: Mar. 31, 2023

(65) Prior Publication Data

US 2023/0316993 A1 Oct. 5, 2023

(30) Foreign Application Priority Data

Apr. 1, 2022 (KR) ........................ 10-2022-0041133
Jul. 27, 2022 (KR) ........................ 10-2022-0092977

(51) Int. Cl.
*G09G 3/32* (2016.01)

(52) U.S. Cl.
CPC ....... *G09G 3/32* (2013.01); *G09G 2320/0247* (2013.01); *G09G 2320/0633* (2013.01); *G09G 2340/0407* (2013.01)

(58) Field of Classification Search
CPC ... G09G 2320/0633; G09G 2340/0407; G09G 3/32; G09G 2320/0247
See application file for complete search history.

(56) References Cited

U.S. PATENT DOCUMENTS

2011/0267387 A1* 11/2011 Baik .................... G09G 3/3406 345/76

FOREIGN PATENT DOCUMENTS

KR 10-1179413 B1 9/2012

* cited by examiner

*Primary Examiner* — Abbas I Abdulselam
(74) *Attorney, Agent, or Firm* — POLSINELLI PC

(57) ABSTRACT

An LED driving circuit adjusts a PWM driving frequency in light emitting diode driving, and changes a PWM frequency of an LED driving circuit in response to a frequency of a PWM clock signal delivered externally or internally.

20 Claims, 14 Drawing Sheets

*FIG. 10*

| M[3:0] | PWM Clock Frequency Multiple |
|---|---|
| 0 | x1 |
| 1 | x2 |
| 2 | x4 |
| 3 | x8 |
| 4 | x16 |
| 5 | x32 |
| 6 | x64 |
| 7 | x1 |
| 8 | x1 |
| 9 | x1 |
| 10 | x1 |
| 11 | x1 |
| 12 | x1 |
| 13 | x1 |
| 14 | x1 |
| 15 | x1 |

Mutiple (M[3:0] = 0 to 6)

Default Value (M[3:0] = 7 to 15)

LED DRIVING CIRCUIT AND ITS DRIVING METHOD

CROSS-REFERENCE TO RELATED APPLICATIONS

This application claims the priority of Korean Patent Application Nos. 10-2022-0041133, filed on Apr. 1, 2022 and 10-2022-0092977 filed on Jul. 27, 2022, which are hereby incorporated by reference in their entirety.

BACKGROUND

Field of the Disclosure

The exemplary aspect relates to an LED driving circuit and a display device including the same.

Description of the Background

As information progresses, various display devices that may visualize information are being developed. A liquid crystal display (LCD), an organic light emitting diode (OLED) display device, a plasma display panel (PDP) display device, etc. are representative examples of display devices which have been developed until recently or are being developed. The display devices are developed to appropriately display a high-resolution image.

In LED display device technology, one large panel is constituted by arranging the required number of modularized LED pixels. Alternatively, in the LED display device technology, one large panel structure is formed by arranging the required number of unit panels constituted by multiple LED pixels. As such, in the LED display device technology, LED pixels are extended and arranged as necessary to easily implement a large display device.

The LED display device is advantageous in terms of diversification of a panel size in a large size, and in the LED display device technology, horizontal and vertical sizes may be variously adjusted according to appropriate arrangement of the LED pixels.

Meanwhile, the LED display device supplies driving current as large as an ON interval of a pulse width modulation (PWM) signal. The ON interval of the PWM signal may be determined according to a gray value of the LED. When LED brightness by a PWM driving control signal is controlled, a flicker phenomenon occurs, and a duty ratio and a frequency of the PWM driving control signal may be appropriately adjusted.

Further, when an external oscillator is used in the process of driving the LED, PWM frequency (fpwm) change is limited, and when data (bit) for determining the PWM frequency (fpwm) is added to a protocol transferred from the outside, there is a problem in that a display resolution decreases. For example, when the PWM frequency increases doubly in 1 frame, data (1 bit) for PWM generation is additionally allocated to reduce the display resolution to half.

The discussions in this section are only to provide background information and do not constitute an admission of prior art.

SUMMARY

The exemplary aspect has been made in an effort to provide an LED driving circuit and its driving method which store an indicator indicating a multiplier frequency of a PWM frequency in a register of an LED driving circuit, and do not receive data for adjustment of the PWM frequency (fpwm) through data communication externally, and may control a PWM operation through internal computation.

In an aspect of the present disclosure, an LED driving circuit includes a current channel electrically connected to a light emitting diode and configured to deliver driving current of the light emitting diode; and a dimming control circuit configured to control the driving current of the light emitting diode according to a duty ratio of a pulse width modulation (PWM) driving control signal and a register configured to store the indicator of a multiplier frequency corresponding to the PWM driving control signal, wherein a frequency of the PWM driving control signal is determined based on a reference clock signal and the multiplier frequency.

In another aspect, an LED driving circuit includes a current channel electrically connected to a light emitting diode and configured to deliver driving current of the light emitting diode; and a dimming control circuit configured to control the driving current of the light emitting diode according to a duty ratio of a pulse width modulation (PWM) driving control signal, in which the dimming control circuit changes a frequency of the driving current in response to the number of clocks of a reference clock signal delivered externally or internally.

In yet another aspect of the present disclosure, an LED driving device includes a micro controller unit generating an LED driving control signal for controlling an operation of a light emitting diode connected to a plurality of current channels and delivering light; and an LED driving circuit generating a pulse width modulation driving control signal based on the LED driving control signal and controlling an operation timing of driving current of the light emitting diode, in which the LED driving circuit changes the operation timing of the light emitting diode every frame.

As described above, according to the exemplary aspect, precision of LED driving may be improved through hybrid scheme LED driving in which PWM driving and PAM driving are distinguished based on reference current, PWM single driving, or PAM single driving, and noise generated in an LED driving process may be reduced.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 10 is a diagram illustrating a frequency multiple stored in a register according to an exemplary aspect.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
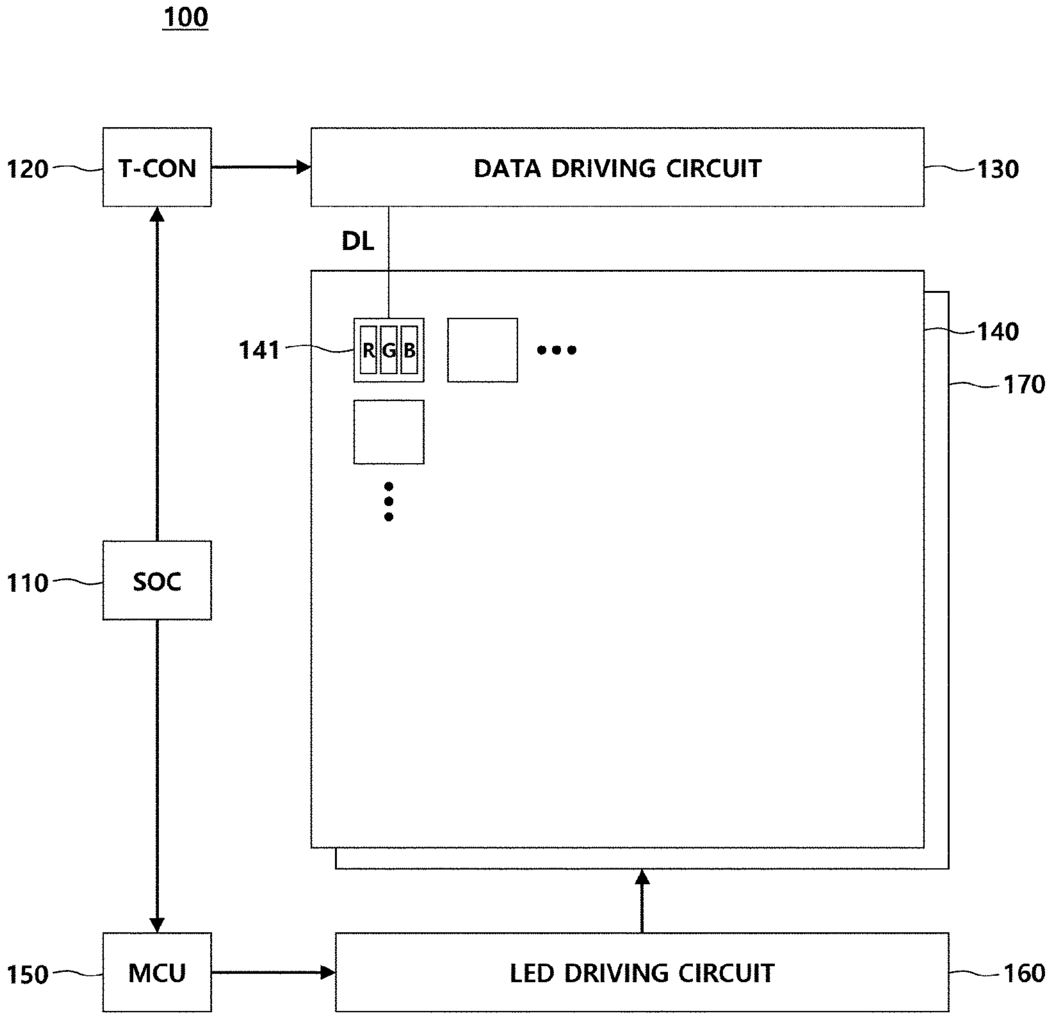
FIG. 1 is a configuration diagram of a display device according to an exemplary aspect.

FIG. 1 is a configuration diagram of a display device according to an exemplary aspect.

Referring to FIG. 1, the display device 100 may include a system on chip (SOC) 110, a timing controller (T-CON) 120, a data driving circuit 130, a display panel 140, a micro controller unit (MCU) 150, an LED driving circuit 160, a backlight 170, etc.

The system on chip 110 may be a circuit performing a function of a central processing unit (CPU), such as an application processor (AP) of a mobile device, and besides, may be a semiconductor chip for performing computation and control operations for controlling an operation of an internal electronic circuit of the display device. The system on chip 110 may control the timing controller 120, the micro controller unit 150, etc. or deliver a signal to each circuit to define an internal operation.

The timing controller (T-CON) 120 may be a circuit controlling an operation timing of the data driving circuit 130, the LED driving circuit 160, etc. Further, the timing controller 120 may control the data driving circuit 130 to generate data voltage corresponding to a gray value of a pixel of the display panel 140 by converting image data input from the outside.

The data driving circuit 130 may control an operation of a pixel 141 through a data line DL by changing a magnitude, a waveform, etc. of the data voltage in response to a control signal delivered by the timing controller 120. For example, the data driving circuit 130 may control an operation of a polarizing plate disposed in the pixel 141.

The display panel 140 may be an organic light emitting diode (OLED), a liquid crystal display (LCD), etc. but may have a structure of being capable of receiving light by the backlight 170. Mini-LED which is acquired by miniaturizing a size of an LED which is installed in an LCD backlight to reduce a disadvantage of an existing LCD requires a chip having a smaller size than an LED driving circuit for an existing LCD operation, and requires a lot of chips.

One pixel P of the panel 140 may have a sub pixel, such as red (R), green (G), blue (B), etc., and determine or change a light wavelength transmitted through a color filter (not illustrated).

The micro controller unit (MCU) 150 may be a device that controls a driving timing, driving current, driving voltage, etc. of the LED by delivering the control signal to the LED driving circuit 160. The timing controller 120 and the micro controller unit 150 may have share some functions, and may be implemented in an integrated form for effective data computation as necessary, but are not limited thereto.

The LED driving circuit 160 may be a device for controlling operations of a plurality of LEDs disposed in the backlight. The LED driving circuit 160 may control an operation of a switch circuit (not illustrated) disposed therein, and control a timing of the driving current or the intensity of the driving current delivered to the LED. The LED driving circuit 160 may change the operation of the LED based on the control signal delivered from the micro controller unit 150 or change the operation of the LED based on a signal delivered from another LED driving circuit. As necessary, the LED driving circuit 160 may change the operation of the LED based on an algorithm or information pre-stored by a registered by an internal register (not illustrated).

The backlight 170 may be a component in which the plurality of LEDs is disposed in a substrate, but may be formed integrally with or separately from the display panel 140 as necessary. The LEDs disposed in the backlight 170 may be individually controlled for each channel according to the LED driving circuit 160.

A component including the panel 140, the LED driving circuit 160, and the backlight 170 may be defined as an LED driving device (not illustrated).

The term "light emitting diode" used in this specification is also used as LED, and may have the same meaning as LED.

Figure 2:
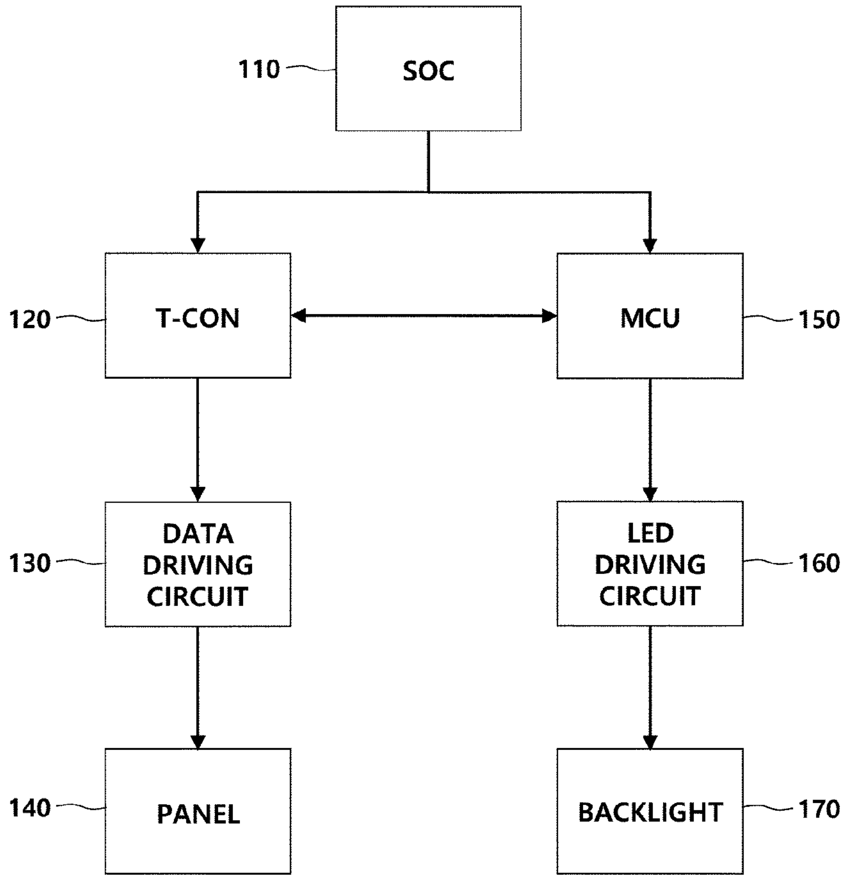
FIG. 2 is a diagram for describing a driving method of a display device according to an exemplary aspect.

FIG. 2 is a diagram for describing a driving method of a display device according to an exemplary aspect.

Referring to FIG. 2, the system on chip (SOC) 110 may control driving of the display panel 140 or driving of the light emitting diode (LED) by the timing controller 120 or the micro controller unit 150.

The timing controller 120 may determine the timings of a gate driving circuit (not illustrated), the data driving circuit 130, and the LED driving circuit 160, and the operation timing of each circuit may be defined to correspond to the entirety or a part of a rising edge or a falling edge of a synchronization signal SYNC or a serial clock signal SLCK.

The timing controller 120 may control the operation of the pixel P by the gate control signal GCS delivered to the gate driving circuit (not illustrated) and a data control signal DCS delivered to the data driving circuit 130. The operation of the polarizing plate of liquid crystals is changed in response to a voltage change of a transistor disposed in the display panel 140, and as a result, a ratio of transmitted light may be appropriately controlled.

The micro controller unit 150 may change the driving voltage or the driving current delivered to the light emitting diode (LED) by an LED control signal LCS.

The timing controller 120 and the micro controller unit 150 may be implemented through integration of circuit components and defined as individual circuit components functionally distinguished as necessary.

Figure 3:
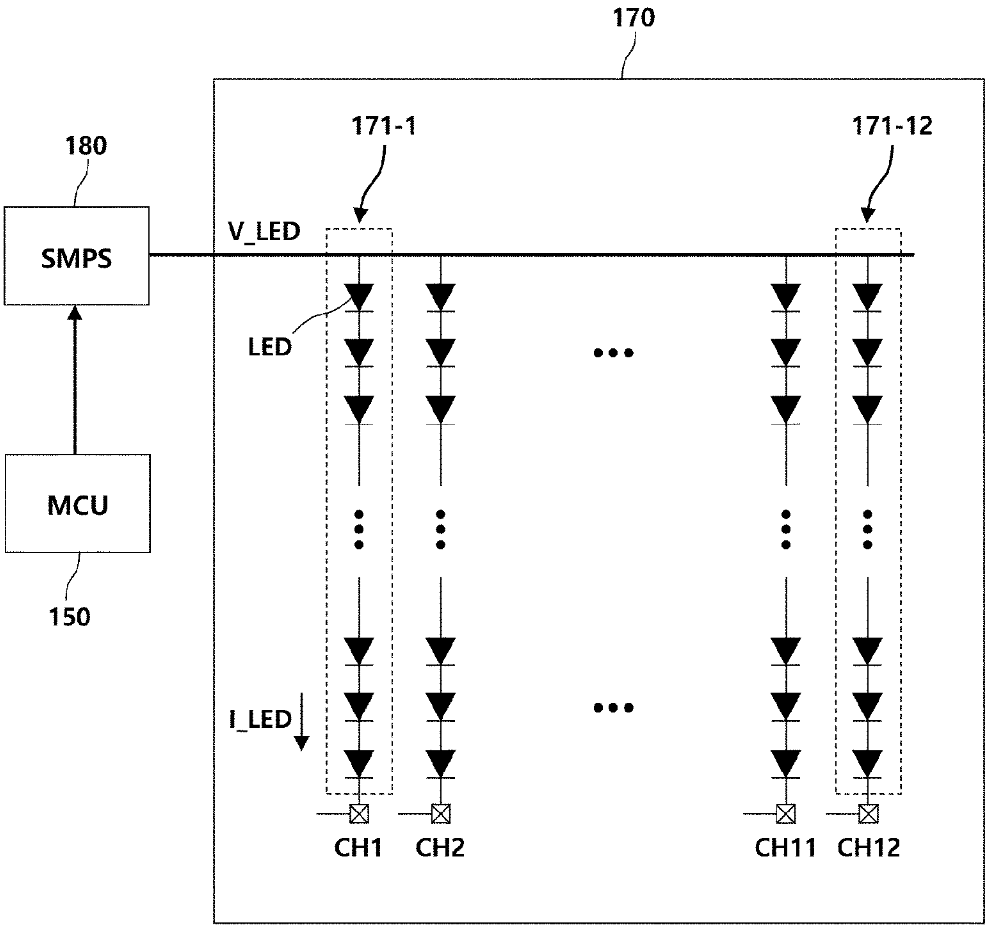
FIG. 3 is a diagram illustrating a method for supplying power for each channel of a light emitting diode according to an exemplary aspect.

FIG. 3 is a diagram illustrating a method for supplying power for each channel of a light emitting diode according to an exemplary aspect.

Referring to FIG. 3, the backlight 170 may receive driving voltage V_LED through one end of an LED string by a switching mode power supply (SMPS) 180, and allows driving current I_LED to flow through a current channel CH1-12 to determine the brightness of the light emitting diode LED.

The switching mode power supply 180 may supply the same driving voltage V_LED or different driving voltage V_LED1 to V_LED12 to a first LED group 171-1 to a twelfth LED group 171-12, and the LED driving circuit (not illustrated) may adjust the driving current I_LED which flows in each LED string by adjusting voltage of the other end for each channel. The LED of the LED string may display an image having a desired brightness by irradiating light to the display panel in response to the driving current I_LED.

The same driving current I_LED may flow in each channel, but different driving current I_LED1 to I_LED12 may flow.

The micro controller unit 150 may adjust the timing, the magnitude, etc., of the LED driving voltage V_LED supplied by the switching mode power supply 180.

The number and forms of LEDs and channels formed in the backlight 170 of FIG. 3 are used for illustrating the driving voltage and the driving current of the LED, and may include various numbers and forms of LEDs not limited thereto.

Figure 4:
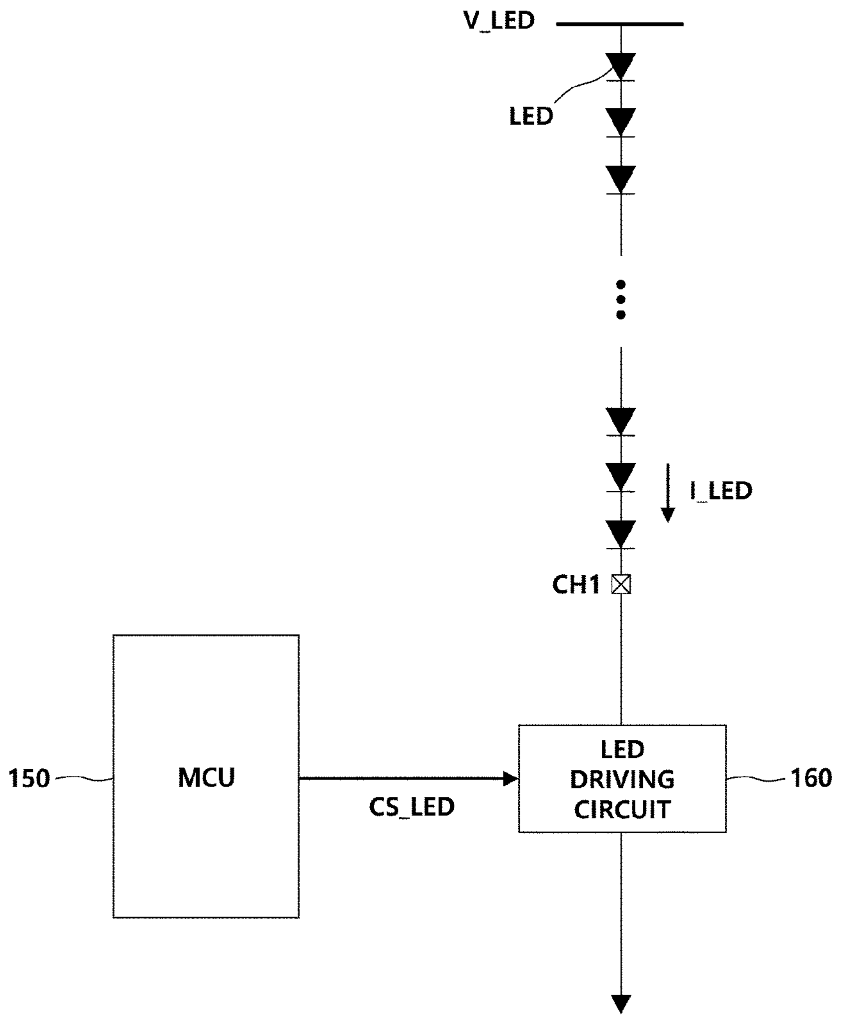
FIG. 4 is a diagram illustrating a decoding method of a video signal according to an exemplary aspect.

FIG. 4 is a diagram illustrating a decoding method of a video signal according to an exemplary aspect.

Referring to FIG. 4, the LED driving circuit 160 is connected to one or more current channels to adjust the brightness of the light emitting diode LED.

The LED driving circuit 160 receives an LED driving control signal CS_LED delivered by the micro controller unit 150, and adjusts the timing or the intensity of the driving current of the light emitting diode LED to adjust the light delivered to the display panel. The LED driving circuit 160 may also adjust the brightness of the light emitting diode LED by controlling the timing or the intensity of the voltage applied to the channel.

The LED driving control signal CS_LED may define the operation timing of the internal circuit of the LED driving circuit 160, and changes a state of an internal transistor of the LED driving circuit 160 to adjust the driving current I_LED of the light emitting diode, which flows on a channel CH1.

For example, the LED driving control signal CS_LED may control turn-on and turn-off of a switch disposed inside the LED driving circuit 160, or control the intensity or a direction of the current which flows on the transistor.

The frequency of the LED driving control signal CS_LED may determine the frequency of the light emitting diode driving current I_LED adjusted by the LED driving circuit 160. For example, when the LED driving control signal CS_LED is a PWM driving control signal, the LED driving circuit 160 may adjust the driving timing of the channel current formed by the LED string, e.g., the driving current I_LED of the light emitting diode. The driving current I_LED of the light emitting diode may repeatedly rise or fall in response to a signal of a high state or a low state of the PWM driving control signal, and such a relationship may be appreciated as the frequency or the timing of the driving current I_LED of the light emitting diode being changed in response to the frequency or the timing of the PWM driving control signal.

Figure 5:
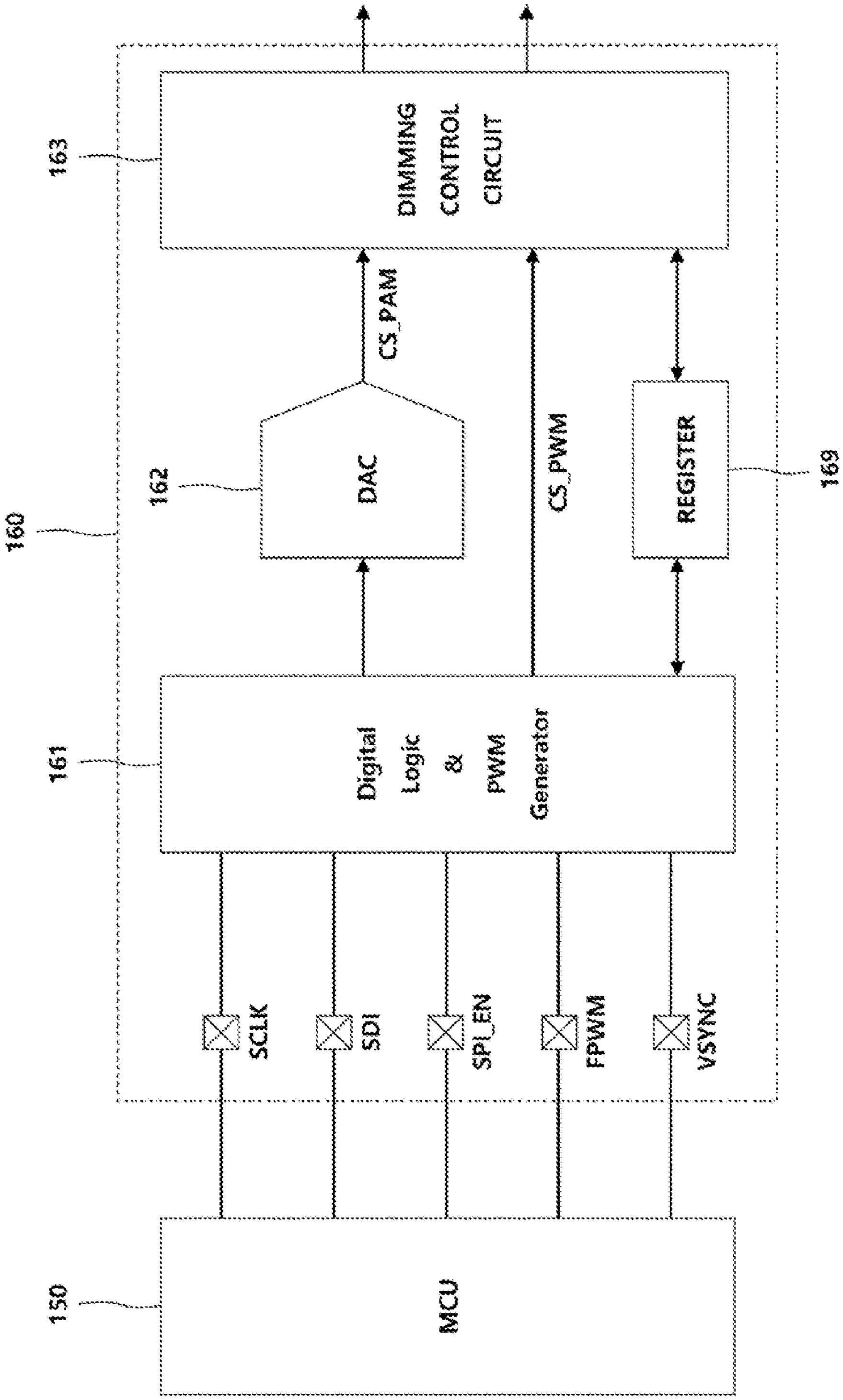
FIG. 5 is a block diagram for each operation element of an LED driving circuit according to an exemplary aspect.

FIG. 5 is a block diagram for each operation element of an LED driving circuit according to an exemplary aspect.

Referring to FIG. 5, the LED driving circuit 160 may include a digital logical operation circuit 161, a digital-analog converter 162, a dimming control circuit 163, a register 169, etc.

The digital logical operation circuit 161 computes a digital type serial clock signal SCLK delivered from the micro controller unit 150 to generate the PAM driving control signal or the PWM driving control signal. The digital logical operation circuit 161 may be implemented in the form of being integrated with or separated from a PWM signal generation circuit (not illustrated), but is not limited thereto.

The digital logical operation circuit 161 may perform a logical operation, e.g., AND logical operation, OR logical operation, etc., for all or some signals of the serial clock signal SCLK, a local dimming signal L/D, a PWM clock signal PWMCLK, a vertical synchronization signal VSYNC, and an enable signal SPI_EN, and output the signals subjected to the logical operation. Here, the PWM clock signal PWMCLK may be replaced with an internal serial clock signal SCLK or an external vertical synchronization signal VSYNC.

Further, the digital logical operation circuit 161 generates the PWM driving control signal CS_PWM to control an operation duty ratio or an operation frequency in the dimming control circuit 163.

The digital-analog converter 162 may convert the digital type signal delivered by the digital logical operation circuit 161 into an analog type signal, and deliver the analog type signal to the dimming control circuit 163.

The dimming control circuit 163 may adjust the duty ratio or the frequency of the PWM driving control signal in current equal to or less than a reference current value or less, and maintain the duty ratio or the frequency of the PWM driving control signal to be constant in current more than the reference current value. The dimming control circuit 163 may define various hybrid driving conditions by utilizing a plurality of reference current values stored in the register 169.

The dimming control circuit 163 may control the operation of the LED based on the duty ratio or the frequency of the PWM driving control signal. The dimming control circuit 163 may change the timing or the frequency of the driving current in response to a clock number of the PWM clock signal delivered externally or internally. Further, the dimming control circuit 163 may control the frequency of the driving current of the light emitting diode to correspond to the frequency of the PWM clock signal generated by the internal oscillator. Further, the dimming control circuit 163 may control the driving current of the light emitting diode based on the number of PWM clock signals delivered externally.

The dimming control circuit 163 may monitor a rising or falling timing of the driving current of the light emitting diode of the current channel, and change the rising or falling timing of the driving current of the light emitting diode. The rising or falling timing of the driving current of the light emitting diode may correspond to the timing and a cycle of the PWM driving control signal or the PWM clock signal determined by the digital logical operation circuit 161.

The frequency of the driving current of the light emitting diode may be defined by the operation timings of rising, falling, inflection, etc., of the driving current of the light emitting diode of the current channel, and may be determined in link with the frequency of the PWM driving control signal. For example, the frequency of the driving current of the light emitting diode may be defined based on the number of rising or falling times of the driving current for each frame or the frequency of the driving current of the light emitting diode may be defined based on the number of rising or falling times within a predetermined time interval.

The register 169 may be a memory type circuit which stores information on an operation mode of the LED driving circuit 160, e.g., information on PWM driving, PAM driving, hybrid driving, etc., or stores information on the current channel of the LED driving circuit 160, and a driving delay or deviation of the LED driving circuit 160.

The register 169 may include an indicator indicating a multiplier frequency as the information on the frequency of the PWM driving control signal CS_PWM generated by the digital logical operation circuit 161. The register 169 may store an indicator meaning an integer multiple of the PWM clock signal PWMCLK, e.g., 1, 2, 4, 8, 16, 32, 64, etc., in a parameter type defined as an integer, and output the indicator based on data of a frequency selection signal delivered through the communication protocol.

The register 169 may store a first indicator and a second indicator for determining the frequency of the PWM driving control signal, and the digital logical operation circuit 161 may determine and change the frequency of the PWM driving control signal as and to a value acquired by multiplying the first indicator or the second indicator stored in the register 169 by the frequency of the PWM clock signal. The PWM clock signal may be referred to as a reference clock signal.

The micro controller unit 150 or the timing controller 120 may generate the LED driving control signal and deliver the generated LED driving control signal to the LED driving circuit 160, and the LED driving control signal may not include data for determining the frequency of the PWM driving control signal. The PWM driving frequency is not determined outside the LED driving circuit 160, and the indicator of the PWM frequency is stored in the register inside the LED driving circuit 160 to control the PWM operation through internal computation, thereby saving a data allocation amount required in the process of data communication. Through this, additional bits for transmission of another data may be allocated by utilizing the saved data bits.

Further, the LED driving circuit 160 changes the PWM driving frequency by such a method to improve a flicker phenomenon which occurs in the panel.

Figure 6:
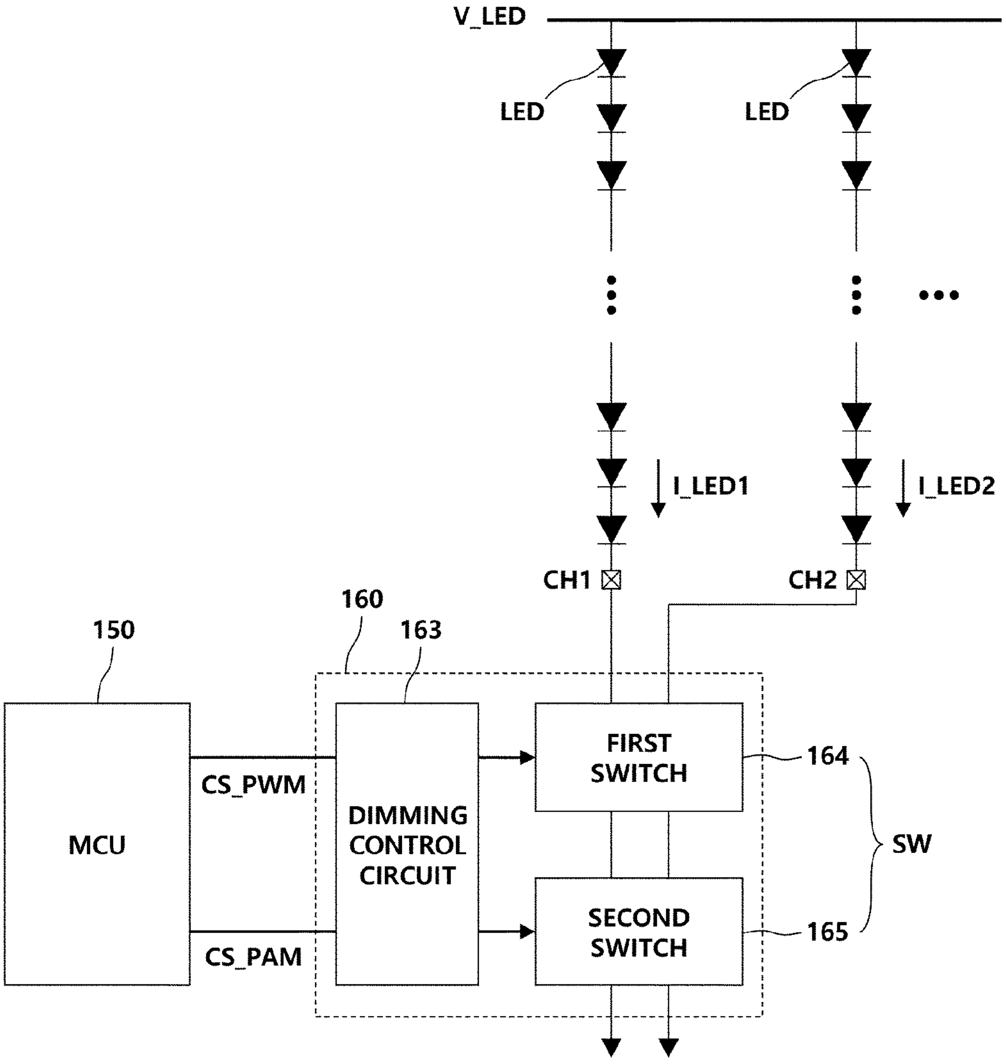
FIG. 6 is a diagram for describing a switch operation of an LED driving circuit according to an exemplary aspect.

FIG. 6 is a diagram for describing a switch operation of an LED driving circuit according to an exemplary aspect.

Referring to FIG. 6, the LED driving circuit 160 may further include a first switch circuit 164 and a second switch circuit 165.

The LED driving circuit 160 may include one or more current channels CH electrically connected to the light emitting diode LED and delivering the driving current of the light emitting diode. For example, first driving current I_LED1 and second driving current I_LED2 may be individually generated and controlled through a first channel CH1 and a second channel CH2, respectively.

The current channel CH may be connected to the light emitting diode LED, the first switch circuit 164, and the second switch circuit 165 in series. The driving voltage V_LED or the driving current I_LED of the light emitting diode LED may be changed by the operations of the first and second switch circuits 164 and 165.

The dimming control circuit 163 may receive the PWM driving control signal CS_PWM or the PAM driving control signal CS_PAM from the micro controller unit 150, and define the operation timings or the operation states of the first switch circuit 164 and the second switch circuit. The current channel CH may include a plurality of channels, and the dimming control circuit 163 may individually control light emitting diode driving current of the plurality of channels in response to the PWM driving control signal or the PAM driving control signal.

The dimming control circuit 163 may set an operation interval of the first switch circuit 164 and the operation interval of the second switch circuit 165 based on a driving current value of the light emitting diode LED or an output current value of the digital-analog converter DAC.

The dimming control circuit 163 outputs the PWM driving control signal to the first switch circuit 164 to adjust the switching timing within a current range between a reference current value or less and 0 and outputs the PAM driving control signal to the second switch circuit 165 to adjust the intensity of the driving current in a current range between more than the reference current value and a maximum current value.

The first switch circuit 164 may adjust the magnitude of the driving current of the light emitting diode according to the duty ratio or the frequency of the pulse width modulation (PWM) signal. For example, in the first switching circuit 164, as the duty ratio of the PWM driving control signal decreases, the time interval of current which passes decreases, and as a result, the driving current I_LED of the light emitting diode may be reduced. The driving current of the light emitting diode may increase and decrease according to the turn-on timing or the turn-off timing of the first switch circuit 164, and the driving current is averaged to define an average intensity of the driving current of the light emitting diode.

The second switch circuit 165 may adjust the magnitude of the driving current of the light emitting diode by receiving the pulse amplitude modulation (PAM) signal. The second switch circuit 165 may receive the PAM driving control signal having an analog type signal waveform or receive the PAM driving control signal having a digital type signal waveform.

The LED driving circuit 160 may individually adjust the PWM driving control signal and the PAM driving control signal delivered to the plurality of current channels, and receive PWM control data for controlling the PWM driving control signal and PAM control data for controlling the PAM driving control signal at the same time interval. In this case, the PWM control data and the PAM control data are simultaneously received to simplify the communication protocol.

According to another exemplary aspect of the present disclosure, the display device may include a plurality of light emitting diodes arranged in the panel, a switch circuit SW adjusting current supplied to the light emitting diode, an LED driving circuit 160 changing the operation current of the light emitting diode by receiving the PWM driving control signal for adjusting turn-on and turn-off periods of the switch circuit, and the PAM driving control signal for adjusting the current intensity of the switch circuit, and a micro controller unit 150 delivering the LED driving control signal to the LED driving circuit so that the LED driving circuit performs hybrid driving in which PWM driving and PAM driving are mixed.

The switch circuit SW may include the first switch circuit 164 changing timings of performing turn-on and turn-off according to the duty ratio of the PWM driving control signal, and the second switch circuit 165 adjusting the magnitude of the driving current of the light emitting diode according to the PAM driving control signal.

The micro controller unit 150 time-divides an LED driving control signal of an N-bit (N is a natural number of 2 or more) code to determine a PWM driving timing and a PAM driving timing. The LED driving control signal may be a control signal for selecting one of a PWM driving mode of performing the PWM driving alone, a PAM driving mode of performing the PAM driving alone, and a hybrid driving mode of performing both of the PWM driving and the PAM driving.

The LED driving circuit 160 may include a plurality of integrated circuits electrically connected to the plurality of current channels, and the plurality of integrated circuits is connected in a serial structure and performs serial peripheral device interface (SPI) communication to sequentially update the driving modes. In the case of the plurality of integrated circuits or the plurality of current channels, the driving modes may be individually defined, and the driving mode may be changed according to one frame or some frames.

The LED driving circuit 160 may include the plurality of current channels, and the LED driving control signal may be a signal for compensating a current deviation by individually adjusting the driving current of each current channel.

Figure 7:
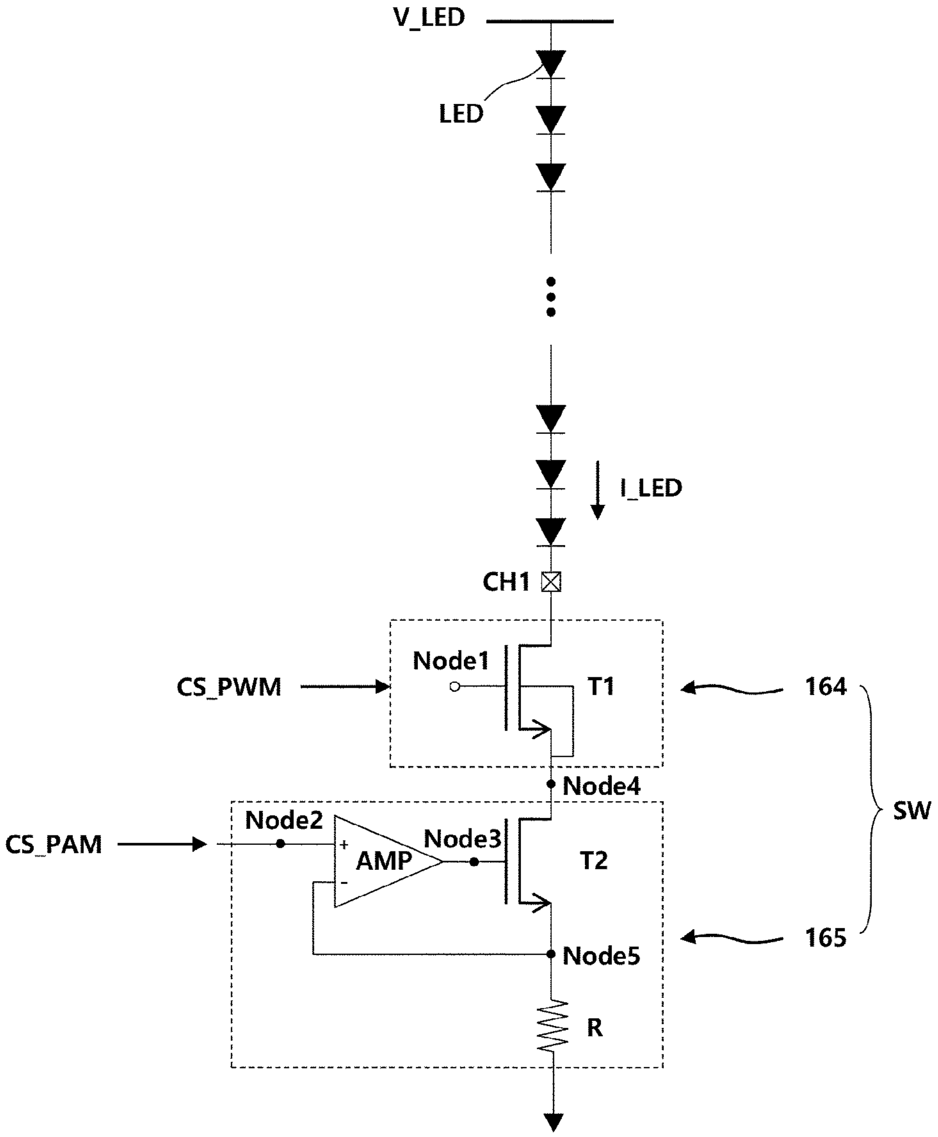
FIG. 7 is a configuration diagram of a switch circuit according to an exemplary aspect.

FIG. 7 is a configuration diagram of a switch circuit according to an exemplary aspect.

Referring to FIG. 7, the switch circuit SW may include the first switch circuit 164 and the second switch circuit 165.

The first switch circuit 164 may include a field effect transistor T1 of which one terminal is electrically connected to the current channel, and the transistor T1 may receive the PWM driving control signal through a gate terminal. One terminal of the transistor T1 may be connected to the current channel of the LED string, and the other terminal may be connected to a transistor T2.

The first switch circuit 164 repeats a turn-on state or a turn-off state in response to the duty ratio or the frequency of the PWM driving control signal to change the state of the supplied current I_LED of the light emitting diode LED.

The second switch circuit 165 may include an operational amplifier AMP receiving the PAM driving control signal through a first input terminal, e.g., a pulse input terminal, a field effect transistor T2 receiving an output signal of the operational amplifier through the gate terminal, and a resistor R connected to a drain terminal of the transistor T2.

Further, the operational amplifier of the second switch circuit 165 may receive drain terminal voltage of the transistor T2 through a second input terminal, e.g., a minus input terminal, and compares a voltage deviation between a plus input terminal and the minus input terminal to determine the output signal.

Figure 8:
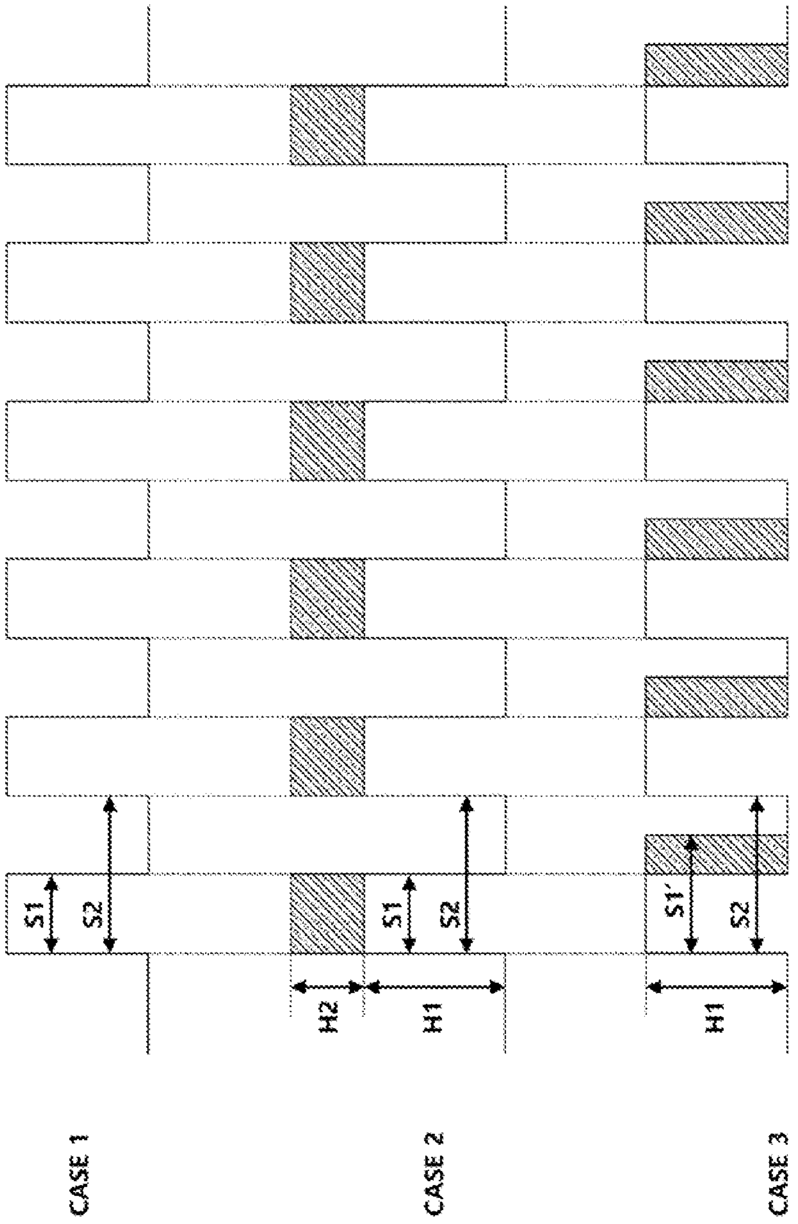
FIG. 8 is a diagram for describing a control method of LED driving current according to an exemplary aspect.

FIG. 8 is a diagram for describing a control method of LED driving current according to an exemplary aspect.

Referring to FIG. 8, the control method of the LED driving current defines a ratio of a period S1 of the turn-on state with respect to a predetermined period S2 as the duty ratio and generates the PWM driving control signal to control the brightness of the LED as in a first case (CASE 1).

The intensity of the driving current may be increased by a method for increasing the magnitude of the current from a first intensity H1 to a second intensity H2 as in a second case (CASE 2). In this case, the brightness of the LED may be changed to be bright by increasing the intensity of the signal while equally maintaining the duty ratio by comparing the first case (CASE 1).

In a third case (CASE 3), the brightness of the LED may be changed by changing the duty ratio while maintaining the intensity of the signal to the first intensity H1. The magnitude of the supplied current of the LED may be increased according to a period S1' of the changed turn-on state. The current is supplied to the LED for a long time to increase the time and the magnitude of the current which stays in the LED.

Figure 9:
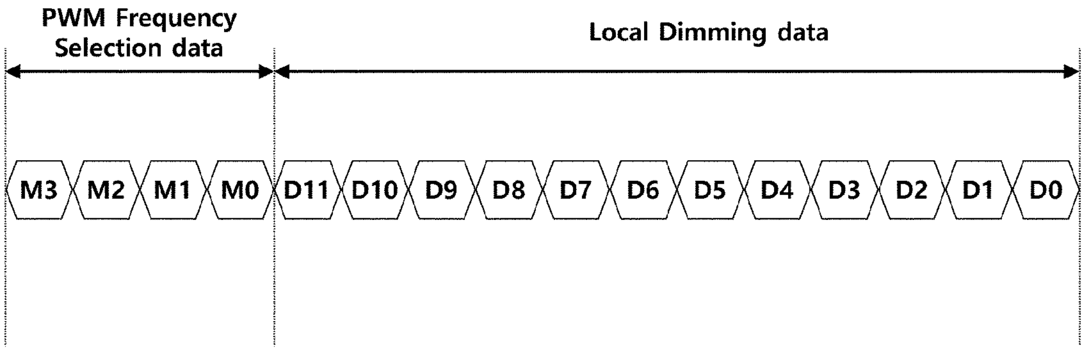
FIG. 9 is a diagram for describing a communication protocol for light emitting diode local dimming according to an exemplary aspect.

FIG. 9 is a diagram for describing a communication protocol for light emitting diode local dimming according to an exemplary aspect.

Referring to FIG. 9, the communication protocol for local dimming of the light emitting diode may include frequency selection data, local dimming data, etc.

Frequency selection data M0 to M3 as a data set of selecting the frequency for the PWM driving may be defined by a time interval of forming the period of the frequency clock signal. The frequency selection data may be preferentially transmitted and received prior to transmitting and receiving the local dimming data, but the local dimming data may be transmitted and received, and the frequency selection data may be transmitted and received later.

Local dimming data D0 to D11 may be data D0 to D5 regarding a PAM driving range and data D6 to D11 regarding a PWM driving range. The PAM driving range may be defined for some of 12-bit data and the PWM driving range may be defined for the remaining data. The local dimming data may further include information on the current deviation for the PAM driving, and may further include information on a cycle, a turn-on period, and a turn-off period for the PWM driving.

FIG. 10 is a diagram illustrating a frequency multiple stored in a register according to an exemplary aspect.

Referring to FIG. 10, a plurality of indicator data may be stored in the register.

The LED driving circuit 160 receives a command signal for changing the PWM frequency through an external serial interface, and reflects an operation delay for each channel and PWM duty ratio and frequency information to a set PWM frequency by using an external PWM clock signal PWMCLK or an internal PWM clock signal PWMCLK to create a final PWM waveform.

When bits allocated to frequency selection among the local dimming data in the communication protocol are 4 bits, values of 0 to 15 may be transmitted, and as a result, indicator data corresponding to the values of 0 to 15 may also be stored in the register.

For example, in 0 to 6, the indicator data may have multiple values of 1, 2, 4, 8, 16, 32, and 64, and the digital logical operation circuit 161 or the dimming control circuit 163 may calculate the frequency of the final PWM driving control signal by multiplying a frequency multiple of the PWM clock signal which becomes a reference by the multiple values.

Therefore, the frequency of the PWM driving control signal may be implemented as a multiple of an internal frame rate.

For example, in 7 to 15, a default value may have a multiple value of one time.

The register may store a plurality of indicators defined as a natural number in the form of a look up table (LUT), and the digital logical operation circuit may acquire the indicator from the register. By such a method, the digital logical operation circuit may change the frequency of the PWM driving control signal to a value acquired by multiplying an indicator indicating the multiplier frequency of the PWM driving control signal and the frequency of the PWM clock signal PWMCLK.

FIG. 10 is exemplary, and the technical spirit of the exemplary aspect is not limited thereto.

Figure 11:
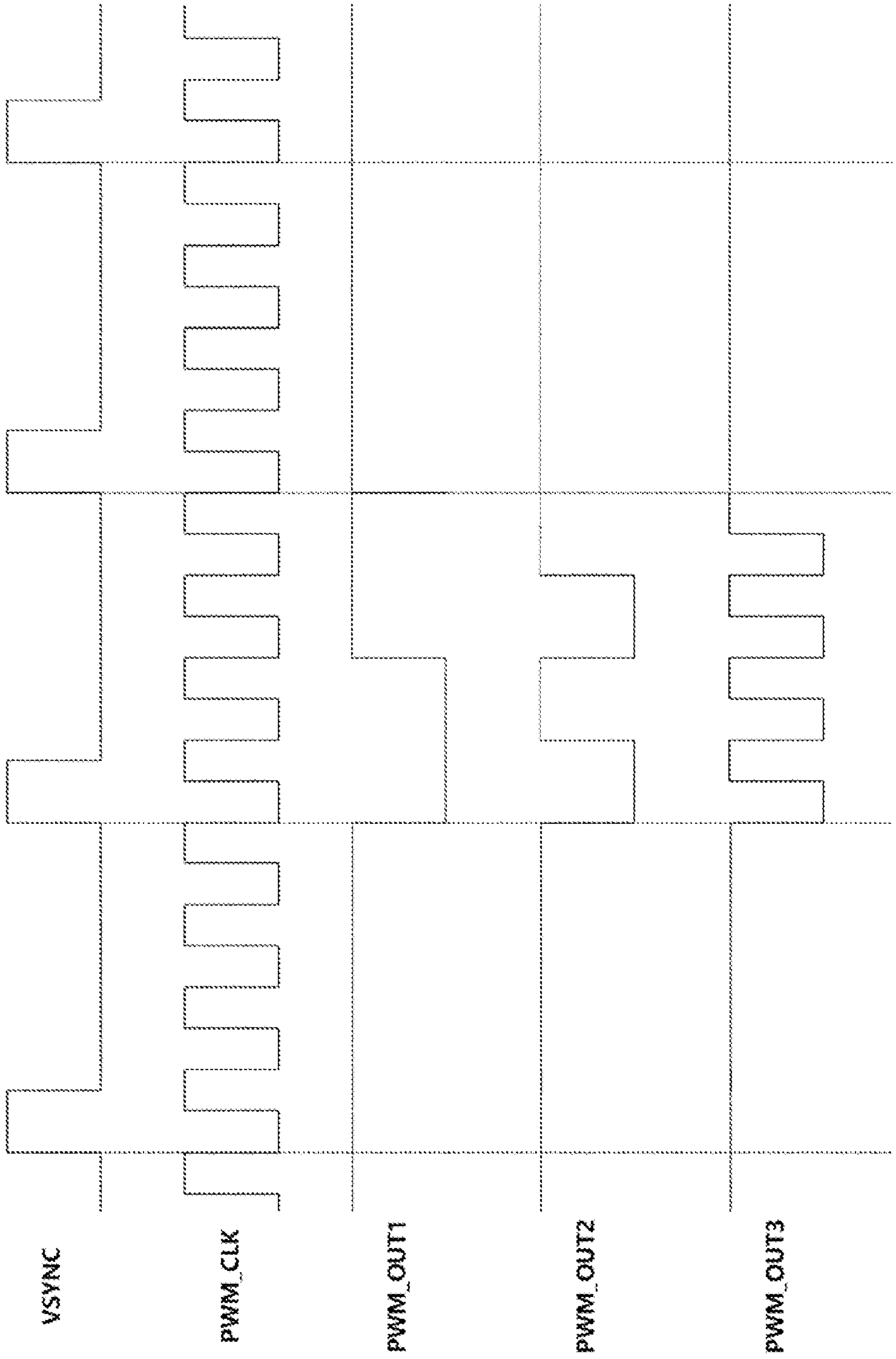
FIG. 11 is a diagram for describing a method for controlling a frequency of a PWM driving control signal according to an exemplary aspect.

FIG. 11 is a diagram for describing a method for controlling a frequency of a PWM driving control signal according to an exemplary aspect.

Referring to FIG. 11, the PWM driving control signal may be output in synchronization with the vertical synchronization signal VSYNC delivered externally. By such a method, the timing of the driving current, the driving voltage, etc., of the light emitting diode may be synchronized with the vertical synchronization signal VSYNC delivered externally.

The PWM clock signal PWM_CLK may be a signal supplied internally or externally, and may be a reference signal for the frequency change of the PWM frequency driving.

The PWM driving control signal supplied to the dimming control circuit 163 may be defined as a first output signal PWM_OUT1, a second output signal PWM_OUT2, a third output signal PWM_OUT3, etc.

The first output signal may have a frequency ¼ times that of the PWM clock signal, and may have a cycle 4 times that of the PWM clock signal.

The second output signal may have a frequency ½ times that of the PWM clock signal, and may have a cycle 2 times that of the PWM clock signal.

The third output signal may have a frequency which is one time larger than the PWM clock signal, and may have a cycle of one time.

By such a method, it is possible to effectively remove a flicker phenomenon with the same brightness by changing the frequency and the cycle of the PWM driving with the same duty ratio. In particular, a delay problem, an operation timing asynchronization problem of the plurality of LEDs, etc., which occur in the process of driving the LED while determining the PWM driving in response to the state of the PWM clock signal delivered internally or externally, may be solved.

The digital logical operation circuit 161 may count the number of PWM clocks PWMCLK delivered externally, and perform edge counting in link with a resolution required for driving the LED. A double edge count may be performed which counts only the rising edge when required data is 4096 data and counts both the rising edge and the falling edge when the required data is 2048 data.

Besides, the frequency of the PWM driving control signal of the LED driving circuit may be changed by utilizing the internal oscillator. In this case, the frequency of the internal PWM clock signal and the frequency of the PWM driving control signal for driving the LED may interlock with each other.

Figure 12:
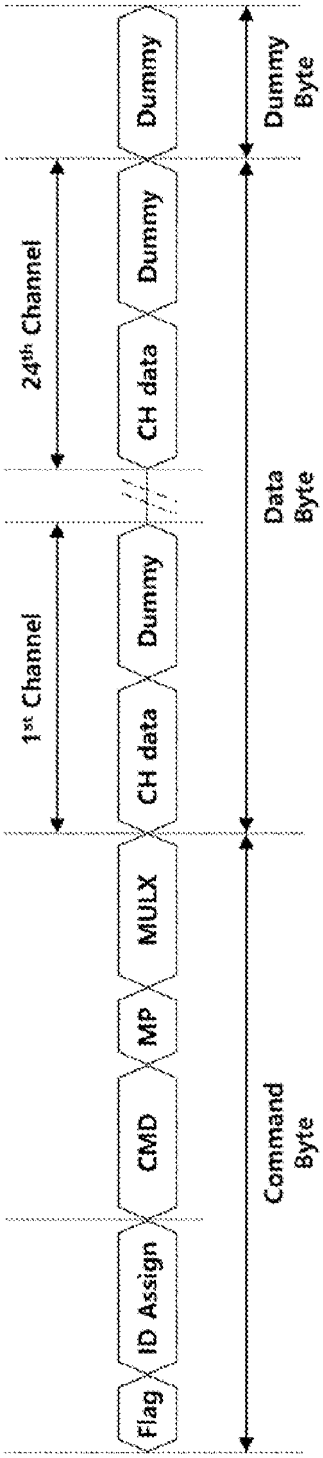
FIG. 12 is a first example diagram illustrating a communication protocol according to an exemplary aspect.

FIG. 12 is a first example diagram illustrating a communication protocol according to an exemplary aspect.

Referring to FIG. 12, the communication protocol may include command byte, data byte, dummy byte, etc.

The command byte may include an ID flag bit, an ID assign bit, a command (CMD) bit, etc.

The command byte as data for determining the operation state of the LED driving circuit may be data for selecting the LED driving circuit which becomes an operation target or setting the current channel in the LED driving circuit. The command byte may set a predetermined value, e. g., values of 0 to 15, to four bits to determine the PWM driving frequency of the LED driving circuit, but is not limited thereto.

The data byte as data for determining the driving current operation for each of channels of the plurality of LED driving circuits may be data for the PWM driving and the PAM driving of the channel.

For example, as the channel data, data regarding the reference current value for the PWM driving and the PAM driving may be transmitted to the data byte or data regarding operation conditions for the PWM driving and the PAM driving defined for each channel may be individually transmitted.

The PWM driving data and the PAM driving data are transmitted at the same time interval for each channel to transmit data of the hybrid driving mode once, and may include a dummy interval to fill a time allocated to each channel.

Figure 13:
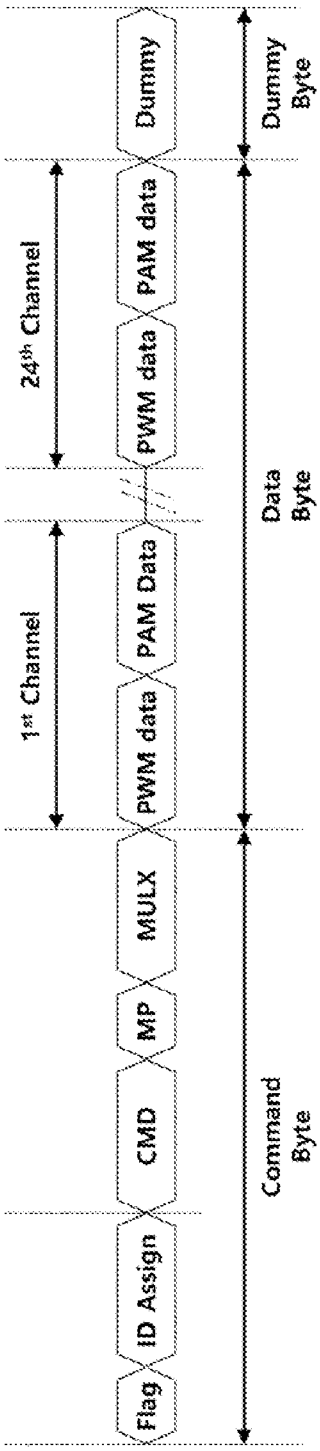
FIG. 13 is a second example diagram illustrating a communication protocol according to an exemplary aspect.

FIG. 13 is a second example diagram illustrating a communication protocol according to an exemplary aspect.

Referring to FIG. 13, the communication protocol for each channel may time-divide and transmit a PWM data interval and a PAM data interval.

The protocol may be divided so that the PWM data is transmitted and received for some of data allocated to one channel, and the PAM data is transmitted and received for the remaining data.

Figure 14:
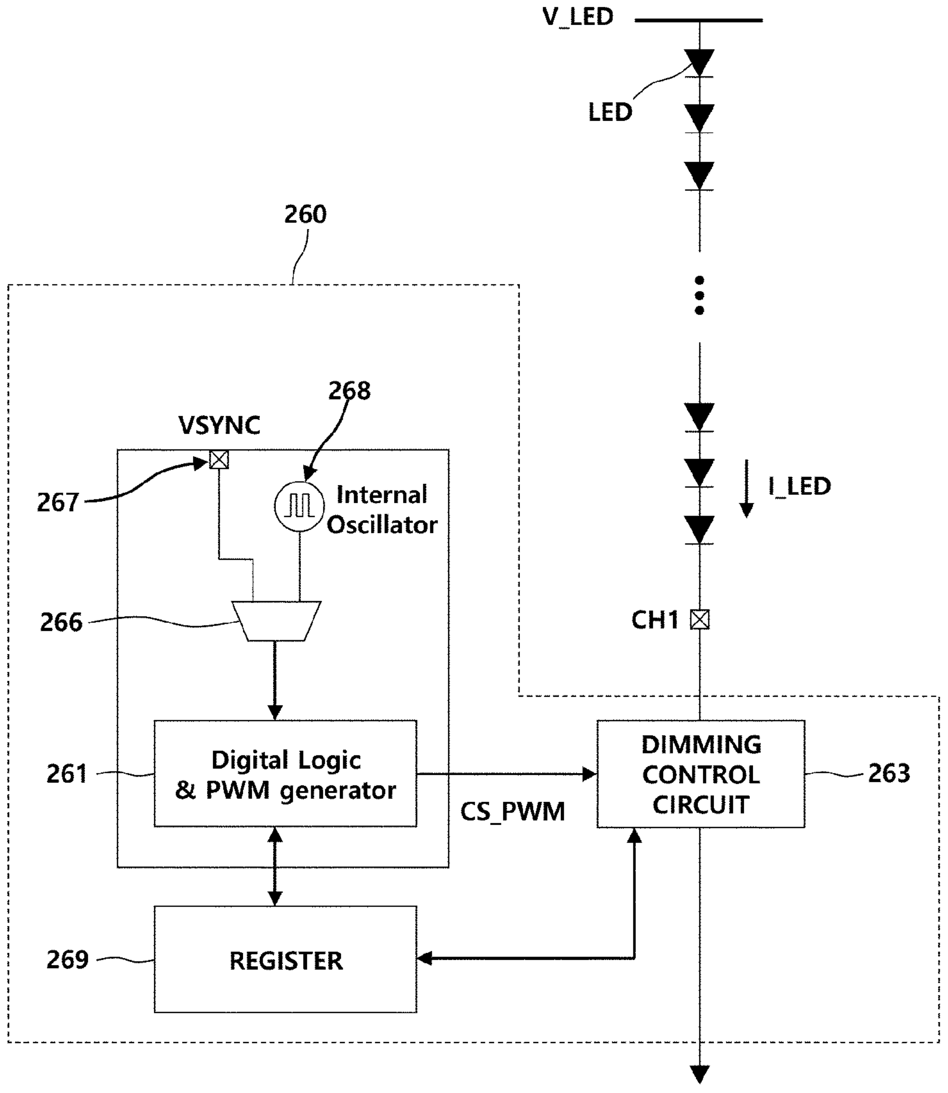
FIG. 14 is a diagram illustrating a signal flow of a logical operation circuit according to an exemplary aspect.

FIG. 14 is a diagram illustrating a signal flow of a logical operation circuit according to an exemplary aspect.

Referring to FIG. 14, the LED driving circuit 260 may include a digital logical operation circuit 261, a dimming control circuit 263, a register 269, etc.

The digital logical operation circuit 261 may determine the duty ratio or the frequency of the PWM driving control signal CS_PWM and deliver the duty ratio or the frequency to the dimming control circuit 263. The dimming control circuit 263 may adjust a supply timing, a rising or falling timing, a frequency, etc., of the driving current of the light emitting diode according to the duty ratio or the frequency of the PWM driving control signal CS_PWM.

The digital logical operation circuit 261 may change the duty ratio of the PWM driving control signal CS_PWM to an integer multiple of the frequency of the PWM clock signal PWMCLK based on the indicator indicating the multiplier frequency of the PWM driving control signal stored in the register 269. The frequency of the PWM driving control signal is changed to a value acquired by multiplying the indicator and the frequency of the PWM clock signal PWMCLK to enable a more effective logical operation. In this case, a frequency multiplier, etc., may be utilized. The indicator stored in the register is input into a circuit that outputs a multiple component of an input frequency to determine and change the frequency of the PWM driving.

The digital logical operation circuit 261 may synchronize and output the PWM driving control signal with the vertical synchronization signal VSYNC delivered through an input terminal 267 by the timing controller. Alternatively, the digital logical operation circuit 261 may synchronize and output the PWM driving control signal with an internal PWM clock signal, e.g., serial clock signal SCLK, generated by an internal oscillator 268.

The digital logical operation circuit 261 counts the number of PWM clock signals delivered externally to determine the frequency of the PWM driving control signal, and the dimming control circuit 263 may adjust the frequency of the driving current of the light emitting diode in response to the frequency of the PWM driving control signal.

When the digital logical operation circuit 261 receives an external PWM clock signal in which the number of clocks is fixed for each cycle, the digital logical operation circuit 261 may count the rising edge or falling edge of the PWM clock signal, but as necessary, counts both the rising edge and the falling edge of the PWM clock signal to appropriately vary the frequency of the PWM driving control signal or the resolution of the display.

The digital logical operation circuit 261 may match the frequency of the PWM driving control signal with the frequency of the internal PWM clock signal generated by the internal oscillator 268.

The dimming control circuit 263 may control the supply timing of the driving current of the light emitting diode according to the duty ratio or the frequency of the PWM driving control signal. Here, the frequency of the PWM driving control signal may determine the on/off timing for the PWM operation.

The dimming control circuit 263 may adjust a driving current control timing to compensate a delay between the plurality of current channels. The dimming control circuit 263 receives information on the PWM clock signal delivered internally or the PWM clock signal delivered externally to adjust the PWM operation frequency and simultaneously, compensate the inter-channel delay. When an external PWM clock signal having clocks of a fixed number is received for each cycle, the frequency of the PWM clock signal is determined by counting the number of clocks to perform LED dimming control and when a PWM clock signal having clocks of a varied number is received from the oscillator inside the LED driving circuit, multiple times of the frame rate may interlock with the PWM frequency for dimming control.

The register 269 may provide data stored in the digital logical operation circuit 261 or the dimming control circuit 263.

The register 269 may store a value for determining the frequency of the PWM driving control signal, and store a plurality of parameters defined as the natural number in the form of the look up table (LUT).

The LED driving circuit 260 may include a first switch circuit (not illustrated) that adjusts the magnitude of the driving current of the light emitting diode according to the duty ratio of the PWM driving control signal and a second switch circuit (not illustrated) that receives the PAM driving control signal and adjusts the magnitude of the driving current of the light emitting diode. The first switch circuit (not illustrated) may include a field effect transistor (MOSFET) T1 of which one terminal is electrically connected to the current channel, and the transistor T1 may receive the PWM driving control signal through a gate terminal.

The dimming control circuit 263 may individually control the driving currents of the light emitting diodes of the plurality of current channels in response to the PWM driving control signal or the PAM driving control signal.

The dimming control circuit 263 may determine the PWM operation of the first switch circuit or the PAM operation of the second switch circuit for each frame, and update the frequency of the PWM driving control signal for the PWM operation.

The LED driving circuit 260 may further include a multiplexer 266 that selects any one of the vertical synchronization signal VSYNC delivered by the timing controller and the internal clock signal generated by the internal oscillator, and delivers the selected signal to the digital logical operation circuit 261.

The multiplexer 266 which determines the type of signal supplied to the digital logical operation circuit 261 may select the PWM clock signal supplied externally or the PWM clock signal supplied internally. Therefore, an operation type of the digital logical operation circuit 261 may be determined according to the type of PWM clock signal. The PWM clock signal supplied externally may be a signal having clocks of a fixed number without an external oscillator, and in this case, the PWM operation control may be performed by counting the number of clocks. In the case of the PWM clock signal supplied internally, the PWM operation may be controlled by multiplying the multiple of the internal frame rate.

The digital logical operation circuit 261 may perform double edge counting by counting both the rising edge and the falling edge of the PWM clock signal.

The LED driving circuit 260 may change an edge counting method of the PWM clock signal in link with the resolution of the display device or an internal situation, and optimize the resolution of the display device by changing the driving timing of the light emitting diode.

It will be apparent to those skilled in the art that various modifications and variations can be made in the LED driving circuit and driving method of the present disclosure without departing from the spirit or scope of the aspects. Thus, it is intended that the present disclosure covers the modifications and variations of the aspects provided they come within the scope of the appended claims and their equivalents.

What is claimed is:

1. An LED driving circuit comprising:

a current channel electrically connected to a light emitting diode and configured to deliver driving current of the light emitting diode;

a dimming control circuit configured to control the driving current of the light emitting diode according to a duty ratio of a pulse width modulation (PWM) driving control signal; and a register configured to store the indicator of a multiplier frequency corresponding to the PWM driving control signal, wherein a frequency of the PWM driving control signal is determined based on a reference clock signal and the multiplier frequency.

2. The LED driving circuit of claim 1, further comprising a digital logical operation circuit configured to determine a rising or falling timing of the driving current of the light emitting diode by computing the duty ratio of the PWM driving control signal, wherein the digital logical operation circuit changes the frequency of the PWM driving control signal to a value acquired by multiplying an indicator indicating the multiplier frequency corresponding to the PWM driving control signal and a frequency of the reference clock signal.

3. The LED driving circuit of claim 2, wherein the register stores a plurality of indicators defined as a natural number in the form of a look up table (LUT), and the digital logical operation circuit acquires the indicator from the register.

4. The LED driving circuit of claim 2, wherein the digital logical operation circuit synchronizes and outputs the PWM driving control signal with a vertical synchronization signal VSYNC delivered by a timing controller, and synchronizes the timing of the driving current of the light emitting diode with the vertical synchronization signal.

5. The LED driving circuit of claim 4, further comprising a multiplexer configured to select any one of the vertical synchronization signal VSYNC delivered by the timing controller and the reference clock signal generated by the internal oscillator and deliver the selected signal to the digital logical operation circuit.

6. The LED driving circuit of claim 2, wherein the digital logical operation circuit synchronizes and outputs the PWM driving control signal with the reference clock signal generated by an internal oscillator, and synchronizes the timing of the driving current of the light emitting diode with the reference clock signal.

7. The LED driving circuit of claim 2, wherein the digital logical operation circuit performs double edge counting of counting both a rising edge and a falling edge of the reference clock signal delivered internally or externally.

8. The LED driving circuit of claim 1, wherein the LED driving circuit comprises:

a first switch circuit configured to adjust a magnitude of the driving current of the light emitting diode according to the duty ratio of the PWM driving control signal, and a second switch circuit configured to receive a pulse amplitude modulation (PAM) driving control signal and adjust the magnitude of the driving current of the light emitting diode.

9. The LED driving circuit of claim 8, wherein the dimming control circuit individually controls rising or falling timings of driving currents of light emitting diodes of a plurality of current channels in response to the PWM driving control signal or the PAM driving control signal.

10. The LED driving circuit of claim 8, wherein the dimming control circuit determines a PWM operation of the first switch circuit or a PAM operation of the second switch circuit, and changes an operation timing of the driving current for the PWM operation.

11. The LED driving circuit of claim 1, wherein the dimming control circuit adjusts a driving current control timing to compensate an inter-channel delay between the plurality of current channels.

12. An LED driving circuit comprising:

a current channel electrically connected to a light emitting diode and configured to deliver driving current of the light emitting diode; and a dimming control circuit configured to control the driving current of the light emitting diode according to a duty ratio of a pulse width modulation (PWM) driving control signal, wherein the dimming control circuit changes a frequency of the driving current in response to the number of clocks of a reference clock signal delivered externally or internally.

13. The LED driving circuit of claim 12, further comprising:

a digital logical operation circuit configured to determine the duty ratio and the frequency of the PWM driving control signal based on the number of clocks of the reference clock signal and deliver the duty ratio and the frequency to the dimming control circuit; and a register configured to store a first indicator and a second indicator indicating a multiplier frequency corresponding to the PWM driving control signal, wherein the digital logical operation circuit determines the frequency of the PWM driving control signal by multiplying the first indicator or the second indicator stored in the register by the frequency of the reference clock signal.

14. The LED driving circuit of claim 13, wherein the digital logical operation circuit counts both a rising edge and a falling edge of the reference clock signal.

15. The LED driving circuit of claim 12, wherein the dimming control circuit controls the frequency of the driving current of the light emitting diode to correspond to the frequency of the reference clock signal generated by an internal oscillator.

16. The LED driving circuit of claim 12, wherein the dimming control circuit controls the frequency of the driving current of the light emitting diode based on the number of reference clock signals delivered externally.

17. An LED driving device comprising:

a micro controller unit generating an LED driving control signal for controlling an operation of a light emitting diode connected to a plurality of current channels and delivering light; and an LED driving circuit generating a pulse width modulation (PWM) driving control signal based on the LED driving control signal and controlling an operation timing of driving current of the light emitting diode, wherein the LED driving circuit changes the operation timing of the light emitting diode every frame.

18. The LED driving device of claim 17, wherein the LED driving circuit counts the number of clocks of a reference clock signal delivered inside or outside the LED driving circuit, determines a value acquired by multiplying a plurality of indicators stored in an internal register and a frequency of the reference clock signal as the frequency of the PWM driving control signal, and changes a rising or falling timing of the driving current of the light emitting diode.

19. The LED driving device of claim 17, wherein the LED driving circuit changes an edge counting method of the reference clock signal by interlocking with a resolution of a display device.

20. The LED driving device of claim 17, wherein the LED driving circuit changes the frequency of the PWM driving control signal to an integer multiple of the frequency of the reference clock signal generated by an internal oscillator and determines the driving current of the light emitting diode by using the frequency of the reference clock signal.

* * * * *